United States Patent
Streett et al.

(10) Patent No.: US 11,487,545 B2
(45) Date of Patent: Nov. 1, 2022

(54) PROCESSOR BRANCH PREDICTION CIRCUIT EMPLOYING BACK-INVALIDATION OF PREDICTION CACHE ENTRIES BASED ON DECODED BRANCH INSTRUCTIONS AND RELATED METHODS

(71) Applicant: Microsoft Technology Licensing, LLC, Redmond, WA (US)

(72) Inventors: Daren E. Streett, Cary, NC (US); Rami Mohammad Al Sheikh, Morrisville, NC (US); Michael Scott McIlvaine, Raleigh, NC (US); Richard W. Doing, Raleigh, NC (US); Robert Douglas Clancy, Cary, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/192,583

(22) Filed: Mar. 4, 2021

(65) Prior Publication Data
US 2022/0283819 A1    Sep. 8, 2022

(51) Int. Cl.
*G06F 9/38*    (2018.01)

(52) U.S. Cl.
CPC .................. *G06F 9/3844* (2013.01)

(58) Field of Classification Search
CPC .... G06F 9/3844; G06F 9/3806; G06F 9/3818; G06F 9/382; G06F 9/3822
See application file for complete search history.

(56) References Cited

U.S. PATENT DOCUMENTS

| 4,847,753 A | | 7/1989 | Matsuo et al. |
| 5,226,130 A | * | 7/1993 | Favor .................... G06F 9/3804 711/125 |

(Continued)

FOREIGN PATENT DOCUMENTS

| CN | 100339825 C | 9/2007 |
| WO | 9113401 A1 | 9/1991 |

OTHER PUBLICATIONS

"International Search Report and Written Opinion Issued in PCT Application No. PCT/US22/017178", dated May 2, 2022, 8 Pages.

*Primary Examiner* — Keith E Vicary
(74) *Attorney, Agent, or Firm* — Withrow & Terranova, PLLC

(57) ABSTRACT

A processor branch prediction circuit employs back-invalidation of prediction cache entries based on decoded branch instructions. The execution information of a previously executed branch instruction is obtained from a prediction cache entry and compared to generated decode information in an instruction decode circuit. Execution information of branch instructions stored in the prediction cache entry is updated in response to a mismatch of the execution information and the decode information of the branch instruction. Existing branch prediction circuits invalidate prediction cache entries of a block of instructions when the block of instructions is invalidated in an instruction cache. As a result, valid branch instruction execution information may be unnecessarily discarded. Updating prediction cache entries in response to a mismatch of the execution information and the decode information of the branch instruction maintains the execution information in the prediction cache.

20 Claims, 7 Drawing Sheets

(56) References Cited

U.S. PATENT DOCUMENTS

| | | | |
|---|---|---|---|
| 6,427,192 B1 * | 7/2002 | Roberts | G06F 9/3806 |
| | | | 711/128 |
| 6,550,004 B1 * | 4/2003 | Henry | G06F 9/3846 |
| | | | 712/236 |
| 2004/0268102 A1 * | 12/2004 | Combs | G06F 9/3844 |
| | | | 712/240 |
| 2012/0311308 A1 * | 12/2012 | Xekalakis | G06F 9/30145 |
| | | | 712/239 |

* cited by examiner

PROCESSOR BRANCH PREDICTION CIRCUIT EMPLOYING BACK-INVALIDATION OF PREDICTION CACHE ENTRIES BASED ON DECODED BRANCH INSTRUCTIONS AND RELATED METHODS

FIELD OF THE DISCLOSURE

The technology of the disclosure relates to fetching instructions for execution in a processor and more particularly to maintaining branch prediction information used to predict which instructions should be fetched.

BACKGROUND

Computer processors execute software applications and other programs that consist of many individual instructions that are executed in a particular order. In a pipelined processor executing a program, each instruction is executed in sequential stages in a series of hardware units. A processor pipeline can begin executing a first instruction in a first pipeline stage in a first cycle of a system clock and begin execution of a second instruction in the first pipeline stage in a second cycle of the system clock while the first instruction is in a second pipeline stage. In a processor with N processing stages, N−1 instructions are at different stages in the pipeline as the first instruction is in the final stage.

Sequential instructions of a program are often stored in sequential memory locations. Branch instructions conditionally or unconditionally determine whether a program will continue with sequential instruction flow or branch to a target instruction stored in a non-sequential memory location. The location of the target instruction may not be determined until execution of the branch instruction is complete in the last stage of the pipeline. In the event of a branch to a non-sequential memory location, all the partially completed sequential instructions following the branch instruction in the pipeline should not be completed and, thus, are purged from the processor. Consequently, at least N−1 cycles of the processor are idle as the destination instruction is fetched from the non-sequential memory location.

To avoid idle processing cycles in the event of a branch instruction, branch prediction may be included in the processor. In one form, branch prediction creates entries in a prediction cache and each entry includes information about branch instructions that have been previously executed, such as the targets of those branch instructions. The branch prediction loads a fetch queue with memory addresses of instructions to be fetched and information about those instructions stored in the prediction cache. If the prediction cache contains an entry with information about a branch instruction, the instruction fetching circuit in the processor may avoid fetching the wrong next instruction. In this manner, branch prediction can avoid idle processor cycles. However, like other caches in a processor, a prediction cache does not have limitless capacity to store entries related to all branch instructions in a program and there are various methods for invalidating existing entries so that other entries can be added.

SUMMARY

Exemplary aspects disclosed herein include a processor branch prediction circuit employing back-invalidation of prediction cache entries based on decoded branch instructions. Related methods of back-invalidating prediction cache entries are also disclosed. To increase instruction fetch accuracy and reduce idle processor cycles, a branch prediction circuit predicts a target instruction address of a target instruction following a previously executed branch instruction based on execution information of the branch instruction stored in a prediction cache entry. In exemplary aspects, the execution information of a branch instruction is obtained from the prediction cache entry and provide to an instruction fetch circuit. The instruction fetch circuit fetches the branch instruction and an instruction decode circuit generates decode information of the branch instruction. A processor branch prediction circuit updates the prediction cache entry based on a mismatch of the stored execution information and the decode information generated in the instruction decode circuit. In an example, the execution information of the branch instruction is provided to the instruction decode circuit by the instruction fetch circuit, and the instruction decode circuit compares the execution information to the generated decode information.

Updating the prediction cache may include invalidating the prediction cache entry. Existing branch prediction circuits invalidate prediction cache entries corresponding to a block of instructions when the block of instructions is invalidated in an instruction cache. As a result, branch instruction execution information that continues to be valid could be unnecessarily discarded. Invalidating prediction cache entries in response to a mismatch of the execution information and the decode information of the branch instruction, as disclosed herein, maintains the execution information for more accurate branch prediction and fewer idle processor cycles.

In an exemplary aspect, a processor configured to execute instructions comprising a branch prediction circuit is disclosed. The branch prediction circuit is configured to generate a memory address of a branch instruction, obtain execution information of the branch instruction from a first entry in a prediction cache based on the memory address, and store the execution information of the branch instruction in a fetch queue. The processor also comprises an instruction fetch circuit configured to fetch the branch instruction based on the memory address stored in the fetch queue. The processor further comprises an instruction decode circuit configured to generate decode information of the branch instruction. The branch prediction circuit is further configured to update the first entry in the prediction cache based on the decode information of the branch instruction.

In another exemplary aspect, an integrated circuit comprising a processor circuit configured to execute instructions is disclosed. The processor circuit comprises a branch prediction circuit configured to generate a memory address of a branch instruction, obtain execution information of the branch instruction from a first entry in a prediction cache based on the memory address, and store the execution information of the branch instruction in a fetch queue. The processor also comprises an instruction fetch circuit configured to fetch the branch instruction based on the memory address stored in the fetch queue. The processor further comprises an instruction decode circuit configured to generate decode information of the branch instruction. The branch prediction circuit is further configured to update the first entry in the prediction cache based on the decode information of the branch instruction.

In another exemplary aspect, a method in a processor circuit is disclosed. The method comprises generating a memory address of a branch instruction, obtaining execution information of the branch instruction from a first entry in a prediction cache based on the memory address, and storing the execution information of the branch instruction in a fetch queue. The method further includes fetching the branch instruction based on the execution information of the branch instruction stored in the fetch queue, generating decode information of the branch instruction, and updating the first entry in the prediction cache based on the decode information of the branch instruction.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
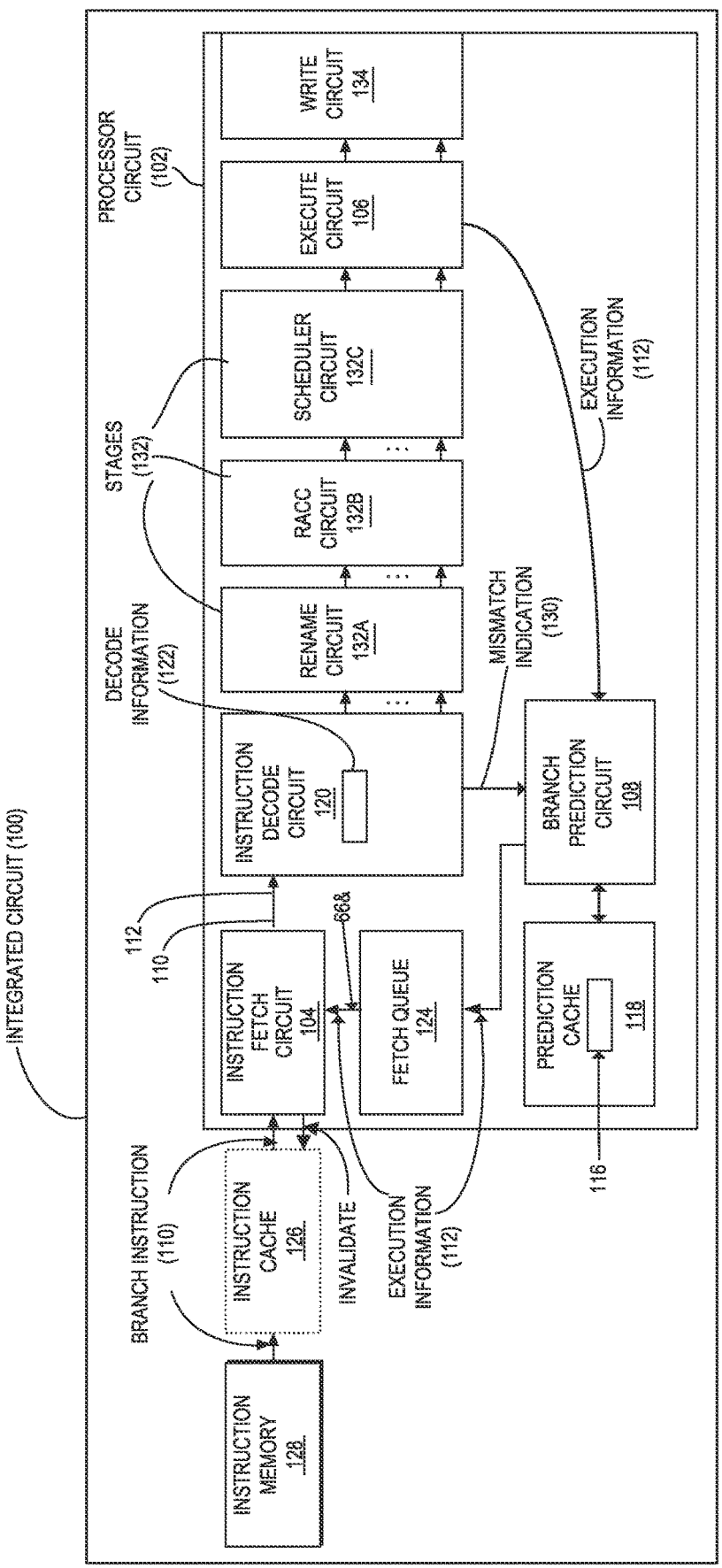
FIG. 1 is a block diagram illustrating an integrated circuit including a processor circuit including a branch prediction circuit that updates execution information of a branch instruction stored in a prediction cache based on decode information of the branch instruction.
Figure 4:
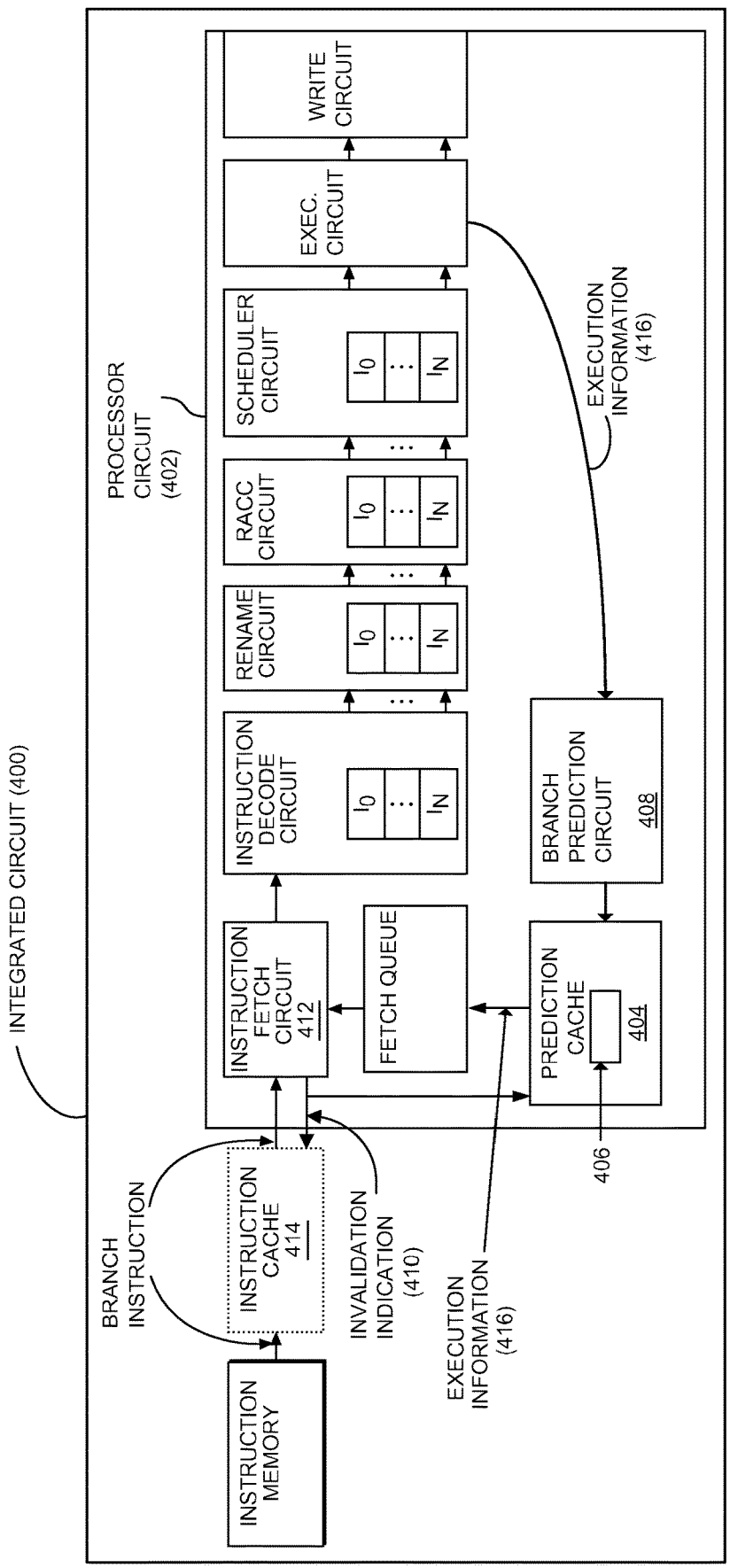
Figure 5:
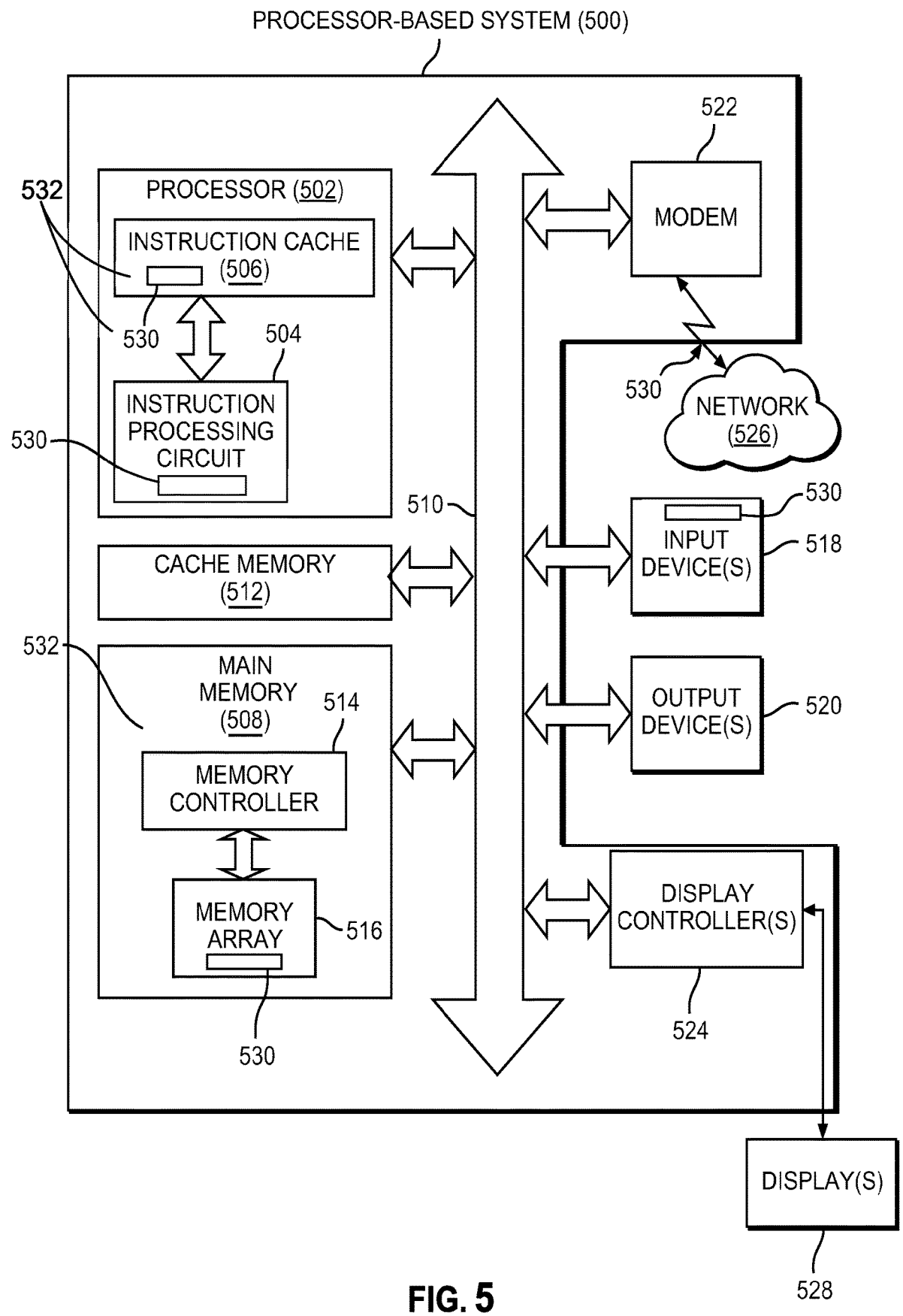

FIG. 4 is a block diagram of a processor circuit including a branch prediction circuit that invalidates prediction cache entries corresponding to blocks of instructions in response to the blocks of instructions being invalidated in the instruction cache; and FIG. 5 is a block diagram of an exemplary processor-based system including a plurality of devices coupled to a system bus, wherein a processor includes a branch prediction circuit that updates execution information of a branch instruction stored in a prediction cache based on decode information of the branch instruction, as in the processor shown in FIG. 1.

DETAILED DESCRIPTION

Exemplary aspects disclosed herein include a processor branch prediction circuit employing back-invalidation of prediction cache entries based on decoded branch instructions. Related methods of back-invalidating prediction cache entries are also disclosed. To increase instruction fetch accuracy and reduce idle processor cycles, a branch prediction circuit predicts a target instruction address of a target instruction following a previously executed branch instruction based on execution information of the branch instruction stored in a prediction cache entry. In exemplary aspects, the execution information of a branch instruction is obtained from the prediction cache entry and provided to an instruction fetch circuit. The instruction fetch circuit fetches the branch instruction and an instruction decode circuit generates decode information of the branch instruction. A processor branch prediction circuit updates the prediction cache entry based on a mismatch of the stored execution information and the decode information generated in the instruction decode circuit. In an example, the execution information of the branch instruction is provided to the instruction decode circuit by the instruction fetch circuit, and the instruction decode circuit compares the execution information to the generated decode information.

Updating the prediction cache may include invalidating the prediction cache entry. Existing branch prediction circuits invalidate prediction cache entries corresponding to a block of instructions when the block of instructions is invalidated in an instruction cache. As a result, branch instruction execution information that continues to be valid could be unnecessarily discarded. Invalidating prediction cache entries in response to a mismatch of the execution information and the decode information of the branch instruction, as disclosed herein, maintains the execution information for more accurate branch prediction and fewer idle processor cycles.

FIG. 1 is a block diagram illustrating an integrated circuit 100 including a processor circuit 102 that executes instructions of an application or other software program. The processor circuit 102 may be a central processing unit (CPU), graphics processing unit (GPU), digital signal processor (DSP), an application specific processor, a controller, an accelerator, etc. The processor circuit 102 has a pipelined architecture in which each instruction is fetched from memory by an instruction fetch circuit 104 and is executed in stages before a result is generated in an execute circuit 106. The processor circuit 102 includes a branch prediction circuit 108 that attempts to predict the flow of instructions that will be executed in an application or program so those instructions can be ready for the processor circuit 102 to execute and idle cycles can be avoided. Idle cycles are wasted time or wasted cycles in a processor in which little or no instruction processing occurs.

A discussion of operation of the processor circuit 102 including the branch prediction circuit 108 is first presented to provide perspective for a description of exemplary aspects of the processor circuit 102 including the branch prediction circuit 108 below. The branch prediction circuit 108 has information about instructions currently being executed in the execute circuit 106 and determines the starting memory address of a block of sequential instructions to be fetched and passes the memory address to the instruction fetch circuit 104. Idle cycles can occur in the processor circuit 102 when the branch prediction circuit 108 incorrectly predicts a target instruction of a branch instruction 110. A target instruction is a next instruction to be executed after a branch instruction 110. A branch instruction 110 in the context of the processor circuit 102 is an instruction that may change the flow of instructions by directing flow to a target instruction at a target address that is not at the next sequential memory address following the branch instruction 110. In some cases, the target instruction of the branch instruction 110 may be in the next sequential memory location after the branch instruction 110. The branch instruction may branch to a non-sequential target instruction unconditionally or may branch to a non-sequential target instruction only when a condition is met or not met. Thus, determining a target instruction of a branch instruction includes determining whether a condition, which may include multiple factors, is met or not met. Determining the target instruction of a branch instruction also depends on determining a target address, which may depend on the results of a calculation of the address. When the branch instruction 110 is executed by the execution circuit 106 execute circuit 106, branch conditions are evaluated and the actual target instruction address of the branch instruction 110 is determined. If the branch prediction circuit 108 incorrectly predicts the target instruction, all the instructions following the branch instruction 110 in the processor circuit 102 must be flushed out and the actual target instruction must be fetched. In this situation, the processor circuit 102 idles while waiting for the target instruction.

The execute circuit 106 generates execution information 112 of the branch instruction 110. The execution information 112 generated upon execution of the branch instruction is used by the branch prediction circuit 108 to predict what the target instruction will be the next time, and subsequent times, the branch instruction is executed in the processor circuit 102. Thus, the execution information 112 of a first execution of a branch instruction becomes prediction information 114 for a next execution of the branch instruction.

The execution information 112 is stored in an entry 116 in a prediction cache 118. The execution information 112 is specific to the branch instruction at a particular memory address. The entry 116 includes execution information 112 for all the branch instructions in a block of sequential instructions. Thus, the entry 116 corresponds to a block of sequential instructions and is identified with an address tag (not shown in FIG. 1) created from a partial virtual address of the block of sequential instructions. In other words, the address tag may be created from some of the bits of the binary virtual starting address of the block of sequential instructions, or from another virtual address that identifies the block of sequential instructions.

In exemplary aspects disclosed herein, the execution information 112 in an entry 116 corresponding to a block of sequential instructions is provided to the instruction fetch circuit 104 with memory address information for the sequential block of instructions. The instruction fetch circuit 104 fetches the instructions in the sequential block of instructions including the branch instruction 110. The instruction fetch circuit 104 then provides the branch instruction 110 and the execution information 112 of the branch instruction 110 to an instruction decode circuit 120. The instruction decode circuit 120 decodes the branch instruction 110 and generates decode information 122. Decoding the branch instruction 110 includes determining [[and]] an instruction type of the branch instruction 110, and identifying fields of the branch instruction 110. Decoding also includes identifying information in such fields, such as operands, registers or addresses.

The instruction decode circuit 120 compares the decode information 122 of the branch instruction 110 to the execution information 112 of the branch instruction 110. If there is a mismatch between the decode information 122 generated in the instruction decode circuit 120 and the execution information 112 of the branch instruction 110, the execution information 112 cannot be reliably used to provide information about the branch instruction, such as the target instruction. The instruction decode circuit 120 informs the branch prediction circuit 108 of the mismatch and the branch prediction circuit 108 updates the entry 116 including the execution information 112 of the branch instruction. In an example, the update may include updating the entry 116 to indicate that the execution information 112 is no longer valid (e.g., invalidating the execution information 112). Updating the entry 116 may also include updating the execution information 112 to indicate that only a portion of the execution information 112 is invalid. Updating the entry 116 may include indicating that the entire entry 116 is invalid. Updating the execution information 112 may include changing the execution information. In an exemplary aspect, the branch processing prediction circuit 108 updates the execution information 112 stored in the prediction cache 118 based on decode information 112 of the branch instruction generated in the instruction decode circuit 120.

With continued reference to FIG. 1, operation of the processor circuit 102 executing a program including a block of sequential instructions including a branch instruction 110 is described in further detail. In this context, a program refers to any set of instructions that performs a task, which may include applications, routines, subroutines, and scripts, for example. As the branch prediction circuit 108 generates addresses of instructions to be executed, the branch instruction 110 may be reached as a next instruction in a block of sequential instructions, as the target of a previous branch instruction, or by another method or algorithm. In this regard, the branch prediction circuit 108 generates the memory address of the branch instruction 110 as an address of an instruction to be fetched. The branch prediction circuit 108 next determines whether the prediction cache 118 includes an entry 116 including the execution information 112 of the branch instruction 110. For example, the branch prediction circuit 108 generates an address tag (not shown in FIG. 1) from a partial virtual address of the block of sequential instructions including the branch instruction 110, and searches the prediction cache 118 for an entry 116 with the corresponding address tag.

If the branch instruction 110 has been previously executed in the execute circuit 106 and has not been invalidated, the entry 116 including the execution information 112 is found based on the address tag. In this manner, the branch prediction circuit 108 obtains the execution information 112 of the branch instruction 110 from the entry 116 in the prediction cache 118 based on the memory address of the branch instruction 110. In one example in which the execution information 112 has been invalidated, the entry 116 with the address tag may be found in the prediction cache 118 but may not contain valid execution information 112 for the branch instruction 110.

If the branch instruction 110 has not been previously executed in the execute circuit 106, the branch prediction circuit 108 determines that the entry 116 is not present in the prediction cache 118 or the entry 116 does not include the execution information 112 of the branch instruction 110. In the absence of execution information 112 of the branch instruction 110, the branch prediction circuit 108 may determine that a target address of a target instruction of the branch instruction 110 is a next sequential memory address following the branch instruction 110.

The branch prediction circuit 108 stores the memory address information of the branch instruction 110 in a fetch queue 124. The instruction fetch circuit 104 obtains the memory address information and the execution information 112, if any, of the branch instruction 110 from the fetch queue 124. The instruction fetch circuit 104 issues a read instruction for the branch instruction 110 at the memory address. The block of sequential instructions including the branch instruction 110 may be found in an instruction cache 126 or in instruction memory 128. If the block of sequential instructions including the branch instruction 110 are not initially found in the instruction cache 126, the block of sequential instructions may be stored into the instruction cache 126 as they are read into the instruction fetch circuit 104 from the instruction memory 128. In this manner, the instruction fetch circuit 104 fetches the branch instruction 110 based on the memory address stored in the fetch queue 124.

The instruction fetch circuit 104 provides the execution information 112 of the branch instruction 110 to the instruction decode circuit 120 in addition to the branch instruction 110. The execution information 112 may be passed to the instruction decode circuit 120 by a different path than is taken by the branch instruction 110. The instruction decode circuit 120 decodes the branch instruction 110 and generates decode information 122 of the branch instruction 110 (e.g., based on the decoding). The instruction decode circuit 120 compares the execution information 112 of the branch instruction 110 to the decode information 122 of the branch instruction 110. Based on the comparison, the instruction decode circuit 120 determines whether the execution information 112 matches the decode information 122 of the branch instruction 110.

In the case that the execution information 112 matches the decode information 122 of the branch instruction 110, it appears to the processor circuit 102 that the execution information 112 in the prediction cache 118 is correct. Thus, the branch prediction circuit 108 maintains the execution information 112 in the first entry 116 of the prediction cache 118. In the case that the execution information 112 does not match the decode information 122, the instruction decode circuit 120 informs the branch prediction circuit 108 of the mismatch. In one example, the instruction decode circuit 120 generates a mismatch indication 130 indicating that the decode information 122 does not match the execution information 112 of the branch instruction 110. The mismatch indication 130 may be a voltage level on a signal wire (not shown) between the instruction decode circuit 120 and the branch prediction circuit 108, as an example.

The branch prediction circuit 108 receives the mismatch indication 130. The branch prediction circuit 108 updates the entry 116 in the prediction cache 118 in response to the mismatch indication 130, where updating the entry 116 includes indicating that the execution information 112 of the branch instruction 110 is invalid or incorrect. In one example, only the execution information 112 of the branch instruction 110 is indicated as being invalid in the entry 116. In one example, only a portion of the execution information 112 is indicated as invalid. In another example, updating the first entry 116 may include deleting the execution information 112 from the entry 116. In another example, updating the entry 116 may include resetting an indication in the entry 116 that the execution information 112 is valid. In another example, the entry 116 is indicated as invalid, which invalidates all execution information 112 stored therein. In this example, updating the first entry 116 may include deleting the entry 116 from the prediction cache 118 or otherwise indicating the entry 116 is invalid, such that there is no execution information 112 in the prediction cache 118 for any branch instruction (110 or other) in the corresponding block of sequential instructions.

As shown in FIG. 1, the processor circuit 102 includes additional stages 132 including rename circuit 132A, register access (RACC) circuit 132B, and scheduler circuit 132C between the instruction decode circuit 120 and the execute circuit 106. Results generated in the execute circuit 106 are written to memory by a write circuit 134. The branch instruction 110 is processed through the stages 132 before reaching the execute circuit 106, where the branch instruction 110 is executed and the execution information 112 is generated. The first time the execute circuit 106 executes the branch instruction 110 (e.g., the first time since the processor circuit 102 was powered on or reset), the branch prediction circuit 108 does not find the execution information 112 for the branch instruction 110 stored in the prediction cache 118. In this situation, the branch prediction circuit 108 determines that the target instruction of the branch instruction 110 is the next sequential address following the branch instruction 110 and no execution information 112 is provided to the instruction decode circuit 120. When the execution information 112 of the branch instruction 110 is initially generated by the execute circuit 106, the execution information 112 may include a different target address that is not the next sequential address following the branch instruction 110. The execute circuit 106 provides the execution information 112 of the branch instruction 110 to the branch prediction circuit 108 and the branch prediction circuit 108 stores the execution information 112 of the branch instruction 110 in the entry 116 in the prediction cache 118.

On subsequent executions of the branch instruction 110 (e.g., due to a program loop), the branch prediction circuit 108 finds the execution information 112 in the entry 116 and determines the memory address of the target instruction of the branch instruction 110 based on the generated execution information 112. In this case, the decode information 122 may match the execution information 112 generated in the first execution, which is stored in the prediction cache 118, and the execution information 112 is maintained in the prediction cache 118.

For various reasons, such as changes affecting loop conditions, self-modifying software, parity errors, etc., the decode information 122 may not match the execution information 112. As an example, the decode information 122 may include a different target instruction than the execution information 110. In this case, the instruction decode circuit 120 informs the branch prediction circuit 108 of the mismatch. Informing the branch prediction circuit 108 of the mismatch may include, for example, updating the entry 116 to indicate that the execution information 112 of the branch instruction 110 is invalid.

Figure 2:
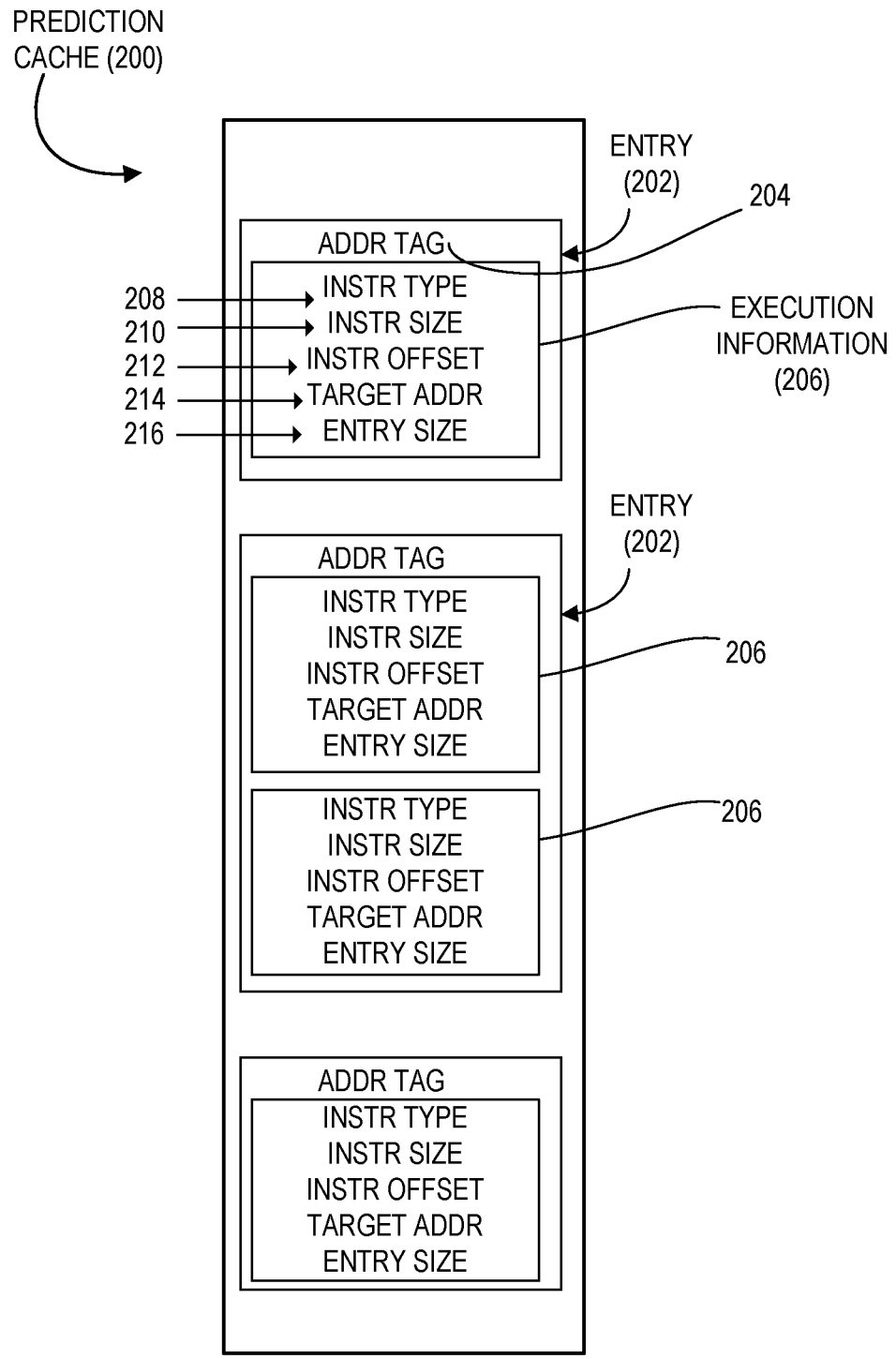
FIG. 2 is a block diagram illustrating a prediction cache including entries that each correspond to a block of instructions.

FIG. 2 is a block diagram illustrating a prediction cache 200 corresponding to the prediction cache 118 in FIG. 1. The prediction cache 200 includes entries 202, which may be the entries 116 in FIG. 1. Each of the entries 202 corresponds to a block of sequential instructions starting at a virtual memory address. An address tag 204 based on part of the virtual memory address identifies each of the entries 202. The entries 202 may include an execution information 206 of one or more branch instructions in the block of sequential instructions. The execution information 206, which may be the execution information 112 in FIG. 1, includes features of a branch instruction that are also generated in the decode information 122 of FIG. 1. In the example in FIG. 2, the execution information 206 includes identifiers of an instruction type 208 of the branch instruction 110, an instruction size 210 of the branch instruction 110, and an instruction offset 212 indicating an address offset of the branch instruction 110 from the starting virtual memory address of the block of sequential instructions. The execution information 206 in FIG. 2 also includes the target address 214 of the branch instruction 110 and an entry size 216 of the entry 116 in the prediction cache 118. Thus, the instruction decode circuit 120 in FIG. 1 generates the mismatch indication 130 in response to a mismatch between a first instruction type 208 in the execution information of the branch instruction and a second instruction type in the decode information of the branch instruction 110. Alternatively, the instruction decode circuit 120 in FIG. 1 generates the mismatch indication 130 in response to a mismatch between a first instruction size 210 in the execution information and a second instruction size in the decode information 122. The mismatch indication 130 may also indicate a mismatch between instructions offset 212 and an instruction offset in the decode information 122 or a mismatch between the target address 214 and a target address in the decode information 122. The branch prediction circuit 108 may use the entry size 216 to manage updates of entries 116 in the prediction cache 118. The execution information 206 may include other fields not specifically mentioned here but which may be generated by the instruction decode circuit 120 when decoding a branch instruction 110. A mismatch indication 130 may be due to a mismatch regarding any of the above examples of execution information 112 or any other fields not specifically mentioned.

Figure 3A:
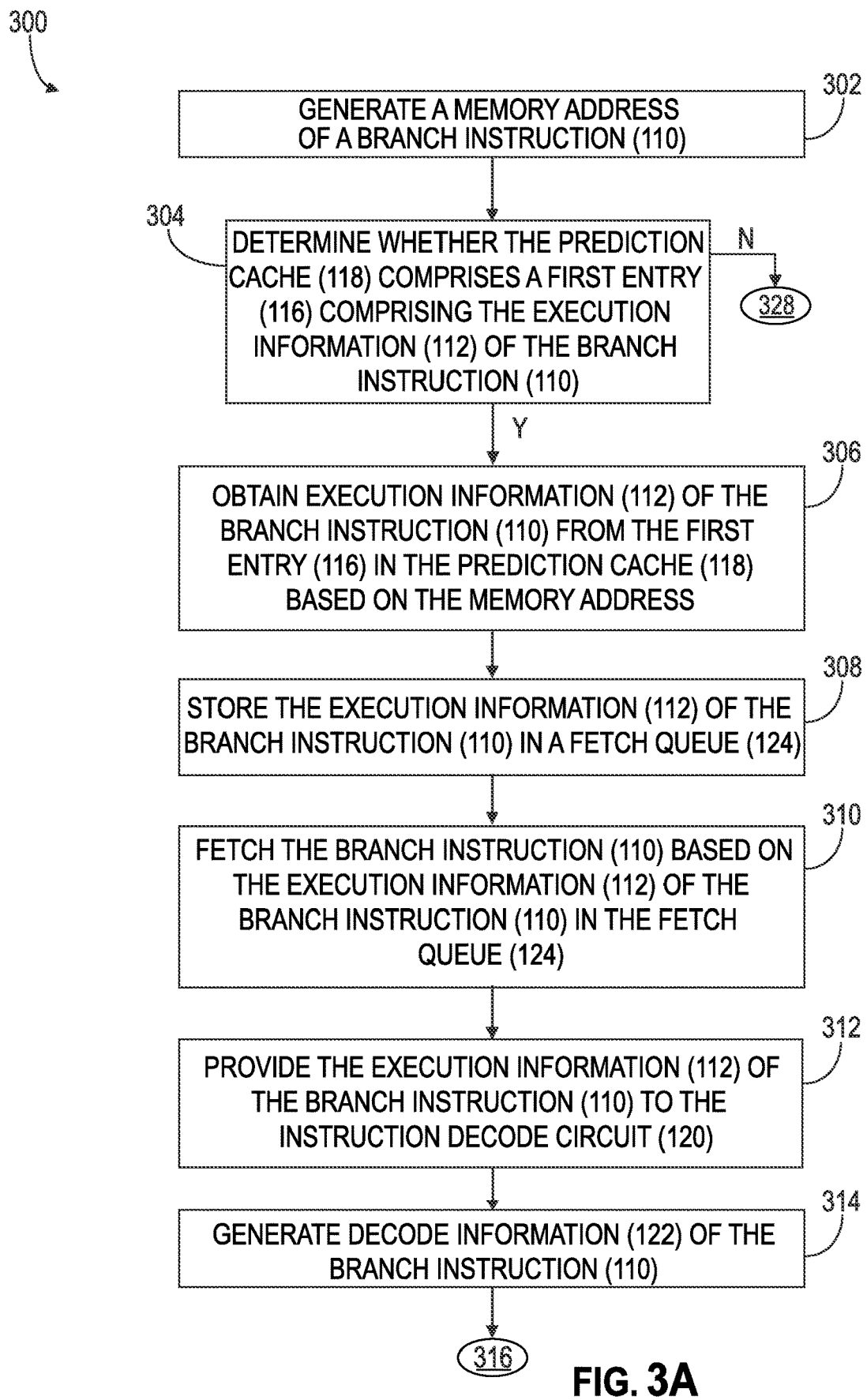
FIGS. 3A-3C are a flow chart illustrating a method of the processor circuit in FIG. 1 executing a branch instruction and updating execution information of the branch instruction stored in processor cache entries based on decode information of the branch instruction.
Figure 3B:
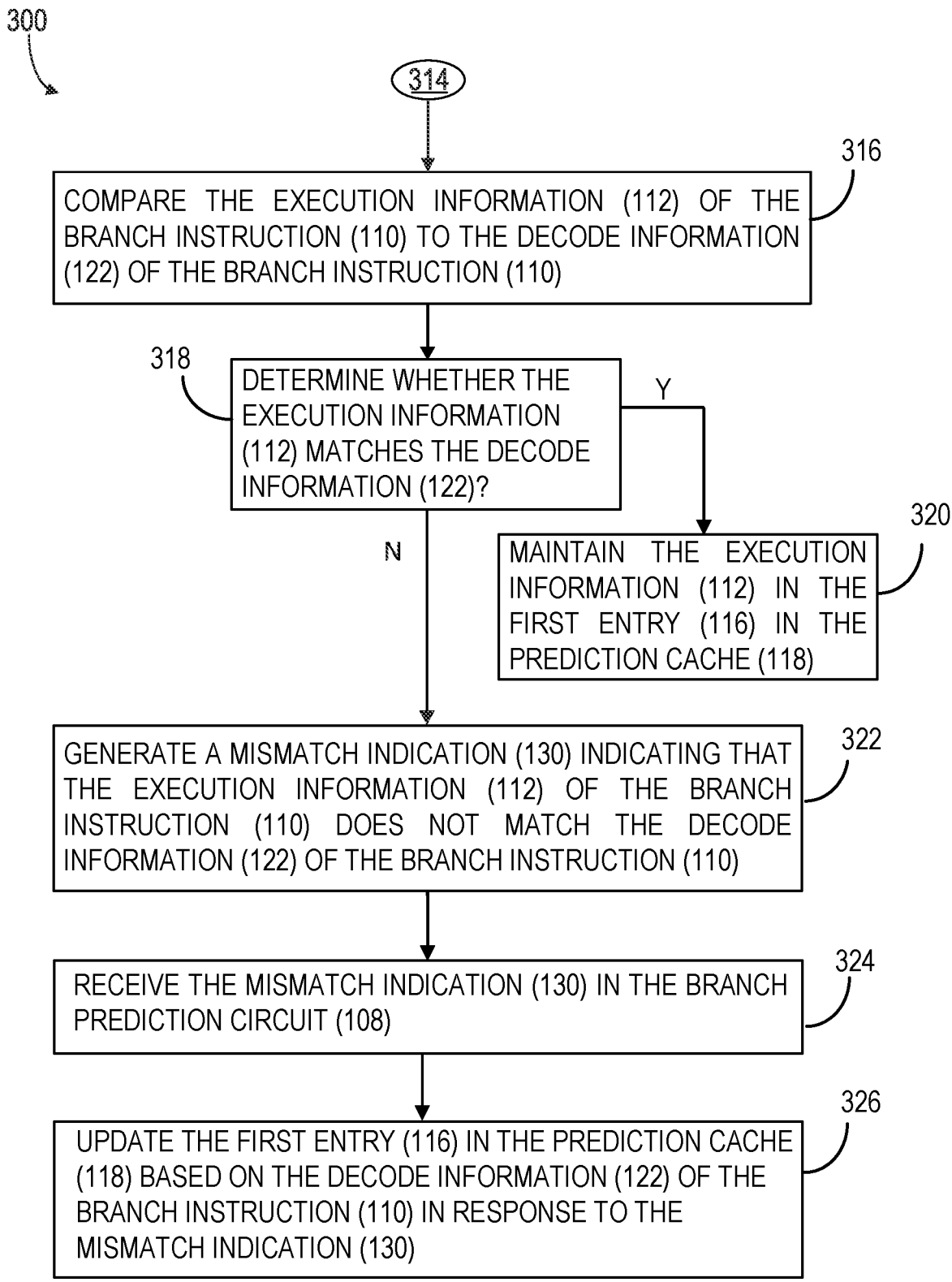
Figure 3C:
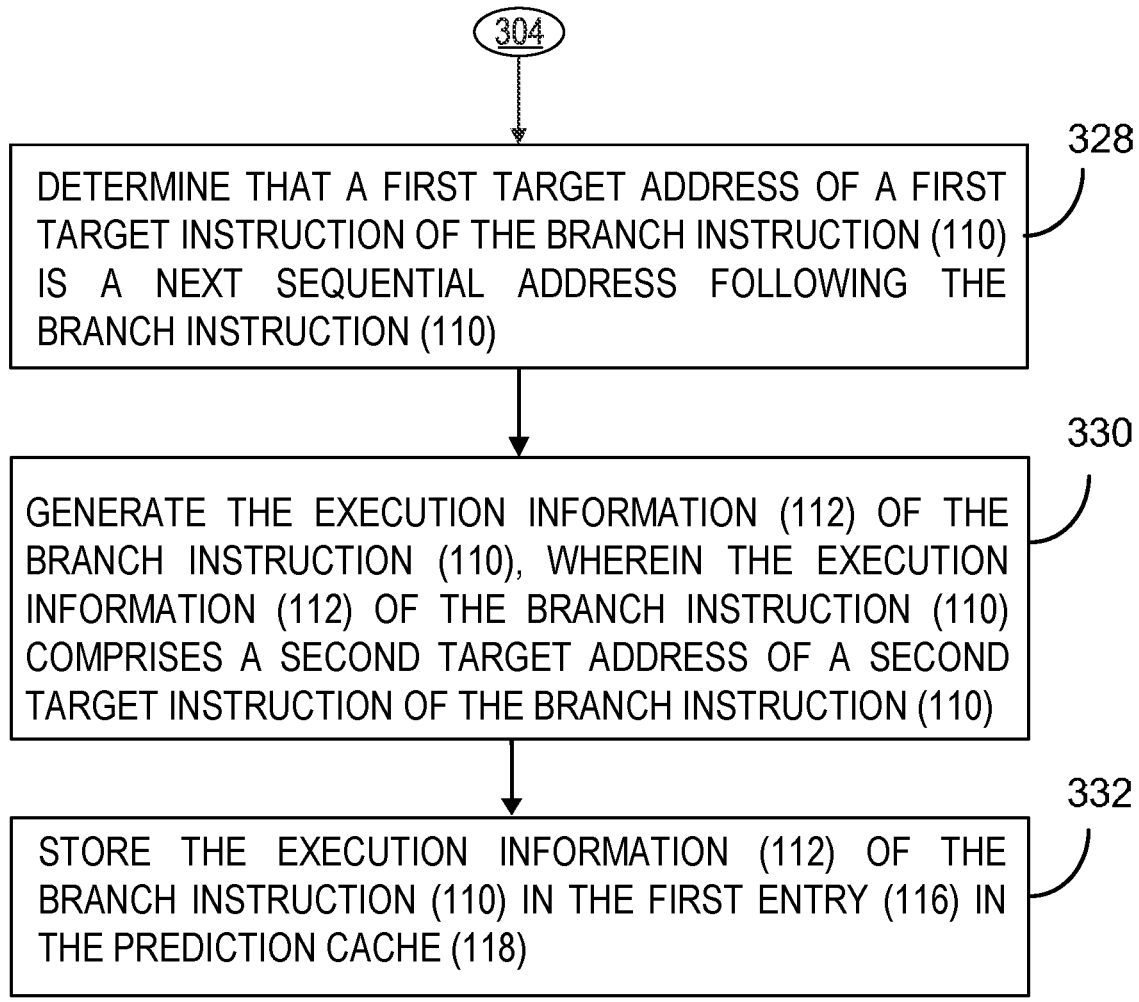

FIGS. 3A-3C are a flow chart illustrating a method 300 of the processor in FIG. 1 of executing the branch instruction 110 and updating the execution information 112 in an entry 116 of the prediction cache 118 based on decode information 122 of the branch instruction 110. The method 300 is described with reference to the features as labeled in FIG. 1. The method 300 includes generating a memory address of a branch instruction 110 (block 302) and determining whether the prediction cache 118 includes a first entry 116 including the execution information 112 of the branch instruction 110 (block 304). The method 300 further includes, when the prediction cache 118 includes the first entry 116 including the execution information 112 of the branch instruction 110, obtaining the execution information 112 of the branch instruction 110 from the first entry 116 in the prediction cache 118 based on the memory address (block 306). The method 300 includes storing the execution information 112 of the branch instruction 110 in the fetch queue 124 (block 308) and fetching the branch instruction 110 based on the execution information 112 of the branch instruction 110 in the fetch queue 124 (block 310). The method 300 in FIG. 3A further includes providing the execution information 112 of the branch instruction 110 to the instruction decode circuit 120 (block 312) and generating the decode information 122 of the branch instruction 110 (block 314).

The method 300 illustrated in FIG. 3B includes comparing the execution information 112 of the branch instruction 110 to the decode information 122 of the branch instruction 110 (block 316) and determining whether the execution information 112 of the branch instruction 110 matches the decode information 122 of the branch instruction 110 (block 318). The method 300 further includes, when the execution information 112 of the branch instruction 110 matches the decode information 122 of the branch instruction 110, maintaining the execution information 112 in the first entry 116 in the prediction cache 118 (block 320). The method 300 further includes, when the execution information 112 of the branch instruction 110 does not match the decode information 122, generating a mismatch indication 130 indicating that the execution information 112 of the branch instruction 110 does not match the decode information 122 of the branch instruction 110 (block 322). The method 300 in FIG. 3B further includes receiving the mismatch indication 130 in the branch prediction circuit 108 (block 324) and updating the first entry 116 in the prediction cache 118 based on the decode information 122 of the branch instruction 110 in response to the mismatch indication 130 (block 326).

With reference back to block 304 in FIG. 3A, when the prediction cache 118 does not include the first entry 116 including the execution information 112 of the branch instruction 110, the method 300 illustrated in FIG. 3C includes determining that a first target address of a first target instruction of the branch instruction 110 is a next sequential address following the branch instruction 110 (block 328). The method 300 further includes generating the execution information 112 of the branch instruction 110 including a second target address of a second target instruction of the branch instruction 110 (block 330). The method 300 in FIG. 3C also includes storing the execution information 112 of the branch instruction 110 in the first entry 116 in the prediction cache 118 (block 332).

FIG. 4 is a block diagram of an integrated circuit 400 including an existing processor circuit 402. Features of the processor circuit 402 are presented in contrast to the integrated circuit 100 in FIG. 1 to clarify the exemplary aspects disclosed above. The processor circuit 402 includes a prediction cache 404 including entries 406 that each correspond to a block of sequential instructions. The processor also includes a branch prediction circuit 408 that receives the execution information 416. The prediction cache 404 receives an invalidation indication 410 from an instruction fetch circuit 412. The invalidation indication 410 indicates that a block of instructions in an instruction cache 414 of the processor circuit 402 is being invalidated. The invalidation indication 410 also invalidates one of the entries 406 corresponding to the block of instructions being invalidated in the instruction cache 414. Thus, execution information 416 stored in the prediction cache 404 may be deleted every time the corresponding block of sequential instructions is invalidated in the instruction cache 414. On each occasion in which the same block of instructions is read back into the instruction cache 414 and a branch instruction in the block of instructions executes for the first time since the prediction cache 404 was invalidated, there is no corresponding execution information 416 available to the branch prediction circuit 408 in the prediction cache 404. The target instruction predicted by the branch prediction circuit 408 without the benefit of execution information 416 is more likely to be incorrect, causing the processor circuit 402 to go idle for several cycles as the correct target instruction is fetched. Other features of the processor circuit 402 may correspond to the features of processor 102 and are not discussed further here.

Branch instructions may be only a small fraction of all the instructions in a block of instructions and information about executed non-branch instructions is not maintained. In addition, the execution information 416 of a branch instruction occupies much less space in the prediction cache 404 than the branch instruction itself occupies in the instruction cache 414. Thus, the amount of storage required to store the execution information 416 is relatively small. In the processor circuit 102 in FIG. 1, the execution information 112 is maintained in an entry 116 in the prediction cache 118 even when the corresponding block of instructions in the instruction cache 126 is invalidated. The benefit provided by the retained execution information 112 offsets the sacrifice of storage that is required in the prediction cache 118. The entries 116 in the prediction cache 118 back-invalidated, as discussed above, may also be invalidated or purged under other circumstances or using algorithms not disclosed herein as needed, such as, for example, to make space for more recently executed branch instructions.

FIG. 5 is a block diagram of an exemplary processor-based system 500 that includes a processor 502 (e.g., a microprocessor) that includes an instruction processing circuit 504. The processor-based system 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 500 includes the processor 502. The processor 502 represents one or more general-purpose processing circuits, such as a microprocessor, central processing unit, or the like. More particularly, the processor 502 may be an EDGE instruction set microprocessor, or other processor implementing an instruction set that supports explicit consumer naming for communicating produced values resulting from execution of producer instructions. The processor 502 is configured to execute processing logic in instructions for performing the operations and steps discussed herein. In this example, the processor 502 includes an instruction cache 506 for temporary, fast access memory storage of instructions accessible by the instruction processing circuit 504. Fetched or prefetched instructions from a memory, such as from a main memory 508 over a system bus 510, are stored in the instruction cache 506. Data may be stored in a cache memory 512 coupled to the system bus 510 for low-latency access by the processor 502. The instruction processing circuit 504 is configured to process instructions fetched into the instruction cache 506 and process the instructions for execution.

The processor 502 and the main memory 508 are coupled to the system bus 510 and can intercouple peripheral devices included in the processor-based system 500. As is well known, the processor 502 communicates with these other devices by exchanging address, control, and data information over the system bus 510. For example, the processor 502 can communicate bus transaction requests to a memory controller 514 in the main memory 508 as an example of a slave device. Although not illustrated in FIG. 5, multiple system buses 510 could be provided, wherein each system bus constitutes a different fabric. In this example, the memory controller 514 is configured to provide memory access requests to a memory array 516 in the main memory 508. The memory array 516 is comprised of an array of storage bit cells for storing data. The main memory 508 may be a read-only memory (ROM), flash memory, dynamic random-access memory (DRAM), such as synchronous DRAM (SDRAM), etc., and a static memory (e.g., flash memory, static random-access memory (SRAM), etc.), as non-limiting examples.

Other devices can be connected to the system bus 510. As illustrated in FIG. 5, these devices can include the main memory 508, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 510 to control information sent to one or more displays 528. The display(s) 528 can include any type of display, including but not limited to a cathode ray tube (CRT), a liquid crystal display (LCD), a plasma display, etc.

The processor-based system 500 in FIG. 5 may include a set of instructions 530 to be executed by the processor 502 for any application desired according to the instructions. The instructions 530 may be stored in the main memory 508, processor 502, and/or instruction cache 506 as examples of a non-transitory computer-readable medium 532. The instructions 530 may also reside, completely or at least partially, within the main memory 508 and/or within the processor 502 during their execution. The instructions 530 may further be transmitted or received over the network 526 via the modem 522.

While the non-transitory computer-readable medium 532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The processor 502 in the processor-based system 500 may include a branch prediction circuit that back-invalidates execution information of a branch instruction stored in a prediction cache based on a comparison to decode information of the branch instruction, as illustrated in FIG. 1.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references referenced throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor circuit configured to execute instructions, the processor circuit comprising hardware comprising:
   a hardware branch prediction circuit configured to:
      generate a memory address of a branch instruction;
      obtain execution information of the branch instruction from a first entry in a prediction cache based on the memory address; and
      store the execution information of the branch instruction in a fetch queue;
   an instruction fetch circuit configured to fetch the branch instruction based on the memory address; and
   an instruction decode circuit configured to generate decode information of the branch instruction;
   wherein the hardware branch prediction circuit is further configured to update the first entry in the prediction cache based on the decode information of the branch instruction mismatching the execution information stored in the fetch queue.

2. The processor circuit of claim 1, wherein the hardware branch prediction circuit is further configured to:
   determine that the first entry in the prediction cache does not comprise the execution information of the branch instruction; and
   determine that a first target address of a first target instruction of the branch instruction is a next sequential address following the branch instruction.

3. The processor circuit of claim 2, further comprising an execution circuit configured to generate the execution information of the branch instruction, wherein the execution information of the branch instruction comprises a second target address of a second target instruction of the branch instruction.

4. The processor circuit of claim 3, wherein the hardware branch prediction circuit is further configured to store the execution information of the branch instruction in the first entry in the prediction cache.

5. The processor circuit of claim 1, wherein:
   the hardware branch prediction circuit is further configured to determine that the first entry in the prediction cache comprises the execution information of the branch instruction; and the instruction fetch circuit is further configured to provide the execution information of the branch instruction to the instruction decode circuit.

6. The processor circuit of claim 5, wherein the instruction decode circuit is further configured to:
compare the execution information of the branch instruction to the decode information of the branch instruction; and
generate a mismatch indication indicating that the decode information of the branch instruction does not match the execution information of the branch instruction.

7. The processor circuit of claim 6, wherein the instruction decode circuit is further configured to generate the mismatch indication in response to a mismatch between a first instruction type in the execution information of the branch instruction and a second instruction type in the decode information of the branch instruction.

8. The processor circuit of claim 6, wherein the instruction decode circuit is further configured to generate the mismatch indication in response to a mismatch between a first size in the execution information of the branch instruction and a second size in the decode information of the branch instruction.

9. The processor circuit of claim 6, the hardware branch prediction circuit further configured to update the first entry in response to the mismatch indication indicating the decode information of the branch instruction does not match the execution information of the branch instruction, wherein updating the first entry comprises indicating that the execution information of the branch instruction is invalid.

10. The processor circuit of claim 9, wherein updating the first entry comprises indicating the first entry is invalid.

11. The processor circuit of claim 1, wherein:
the first entry in the prediction cache comprises execution information of branch instructions in a block of instructions including the branch instruction; and
the hardware branch prediction circuit is further configured to, in response to the block of instructions corresponding to the first entry being invalidated in an instruction cache, maintain the first entry in the prediction cache to indicate that the execution information of the branch instruction is valid.

12. An integrated circuit comprising a processor circuit configured to execute instructions, the processor circuit comprising:
a hardware branch prediction circuit configured to:
generate a memory address of a branch instruction;
obtain execution information of the branch instruction from a first entry in a prediction cache based on the memory address; and
store the execution information of the branch instruction in a fetch queue;
an instruction fetch circuit configured to fetch the branch instruction based on the memory address; and
an instruction decode circuit configured to generate decode information of the branch instruction;
wherein the hardware branch prediction circuit is further configured to update the first entry in the prediction cache based on the decode information of the branch instruction mismatching the execution information stored in the fetch queue.

13. A method in a processor circuit, the method comprising:
generating a memory address of a branch instruction;
obtaining execution information of the branch instruction from a first entry in a prediction cache based on the memory address;
storing the execution information of the branch instruction in a fetch queue;
fetching the branch instruction based on the memory address of the branch instruction;
generating decode information of the branch instruction; and
updating the first entry in the prediction cache based on the decode information of the branch instruction mismatching the execution information stored in the fetch queue.

14. The method of claim 13, further comprising:
determining that the first entry in the prediction cache comprises the execution information of the branch instruction; and
providing the execution information of the branch instruction to an instruction decode circuit.

15. The method of claim 14, further comprising:
comparing the execution information of the branch instruction to the decode information of the branch instruction; and
generating a mismatch indication indicating that the decode information of the branch instruction does not match the execution information of the branch instruction.

16. The method of claim 15, further comprising:
updating the first entry in the prediction cache to indicate the execution information in the first entry is invalid in response to the mismatch indication.

17. The method of claim 16, further comprising generating the mismatch indication in response to a mismatch between a first instruction type in the execution information of the branch instruction and a second instruction type in the decode information of the branch instruction.

18. The method of claim 16, further comprising generating the mismatch indication in response to a mismatch between a first size of the branch instruction in the execution information of the branch instruction and a second size of the branch instruction in the decode information.

19. The method of claim 16, wherein updating the first entry comprises indicating that a portion of the first entry is invalid.

20. The method of claim 14, further comprising:
in response to a block of instructions being invalidated in an instruction cache, maintaining the first entry in the prediction cache to indicate that the execution information in the first entry is valid;
wherein the first entry in the prediction cache comprises execution information of branch instructions in the block of instructions.

* * * * *